United States Patent

[11] 3,569,616

| [72] | Inventor | Charles E. Baker |
| | | Dallas, Tex. |
| [21] | Appl. No. | 649,916 |
| [22] | Filed | June 29, 1967 |
| [45] | Patented | Mar. 9, 1971 |
| [73] | Assignee | Texas Instruments Incorporated |
| | | Dallas, Tex. |

[54] HIGH RESOLUTION PPI SCAN CONVERTER
4 Claims, 5 Drawing Figs.

[52] U.S. Cl. .................................................. 178/6.8,
 178/7.3, 178/7.6, 250/199, 350/160
[51] Int. Cl. .................................................. H04n 5/02
[50] Field of Search .................................................. 350/160
 (P); 178/6 (LCR), 6.7, 6.8, 6.8 (CR), 7.6, 7.85,
 7.87, 6.6 (TPR), 7.30; 250/199

[56] References Cited
UNITED STATES PATENTS

| 3,134,297 | 5/1964 | Carlson | 178/7.87 |
| 3,249,692 | 5/1966 | Clau | 178/6LC |
| 3,251,936 | 5/1966 | Berchtold | 178/6.8 |
| 3,253,497 | 5/1966 | Dreyer | 178/7.87 |
| 3,316,348 | 4/1967 | Hufnagel | 178/7.6 |
| 3,345,459 | 10/1967 | Dudley | 178/7.85 |
| 3,348,233 | 10/1967 | Hertz | 178/6.7 |
| 3,389,219 | 6/1968 | Stetten | 178/6.8 |
| 3,395,246 | 7/1968 | Stetten | 178/6.8 |
| 3,401,232 | 9/1968 | Goldhammer | 178/6LC |

*Primary Examiner*—Robert L. Griffin
*Assistant Examiner*—Joseph A. Orsino, Jr.
*Attorneys*—Samuel M. Mims, Jr., James O. Dixon, Andrew M. Hassell, Harold Levine, Rene E. Grossman and John E. Vandigriff ABSTRACT: A scan conversion system is disclosed in which a modulated laser beam "writes" an image on an optical-recording medium using one type of scan pattern and the image is "read" by a flying spot scanner or similar device operating on a different scan pattern.

HIGH RESOLUTION PPI SCAN CONVERTER

This invention relates to bright screen information display systems, and more particularly to the conversion of radar PPI information to a bright screen display.

Conventional radar Plan Position Indicator (PPI) displays are often objectionable because of their inherent lack of brightness, due mainly to the low rate of information flow from the antenna. Because of this lack of brightness, the tube can only be viewed satisfactorily under low levels of ambient lighting. Thus, radar operators are usually required to work either under controlled lighting conditions or with the use of viewing hoods. However, for many operational situations, such as in airport control towers, the bridge of a ship or the cockpit of an aircraft, for example, there is a real need for a bright radar display because of the necessarily high ambient lighting level and the inconvenience of using viewing hoods.

Several bright displays for radar information have been developed, but one of the most used is the radar-television scan conversion system. This system uses a bombardment-induced conductivity tube. Such a tube and the scan conversion system in which it is utilized is fully described by D. L. Plaistow in "An Experimental Scan Conversion System For The Production Of Bright Radar Displays," Marconi Review, 23 No. 139 pp. 184—203, 1960. The tube contains two electron guns mounted opposite each other with an insulating sheet between them. One of the guns, the "write" gun, causes the insulating sheet to become electrically charged with a charge distribution corresponding to the PPI scan pattern, while the other gun, the "read" gun, reads the charge on the sheet and produces variable currents corresponding to the "written" information, which currents are transmitted to suitable television equipment and displayed in a television scan pattern. This scan conversion system, while producing a bright display, does not achieve the high resolution needed for optimum information transmittal.

Accordingly, it is an object of this invention to provide a scan conversion system which achieves a high resolution scan conversion from one scan pattern to another.

Another object of the invention is to provide a scan conversion system which converts from a low brightness PPI scan to a high brightness, high resolution raster scan.

Yet a further object is to provide a scan conversion system which accomplishes a scan conversion by the use of a photochromic material which is optically excited by a modulated laser beam.

These and other objects and features of the invention will be better understood by reference to the following detailed description when read in conjunction with the appended claims and accompanying drawings, wherein:

FIG. 4 shows a system for reading and projecting information stored on a photochromic plate using a flying spot scanner and laser display system; while

In brief, the invention appertains to a scan conversion system in which a laser beam is modulated by a video signal resulting from the conversion of the RF signal received from the radar antenna. The modulated laser beam is then caused to trace (or "write") a PPI scan on a photochromic plate, whereupon the PPI image on the plate is detected (or "read") by a flying spot scanner. The output from the scanner then provides video information either to a television monitor or a laser display system.

Figure 1:
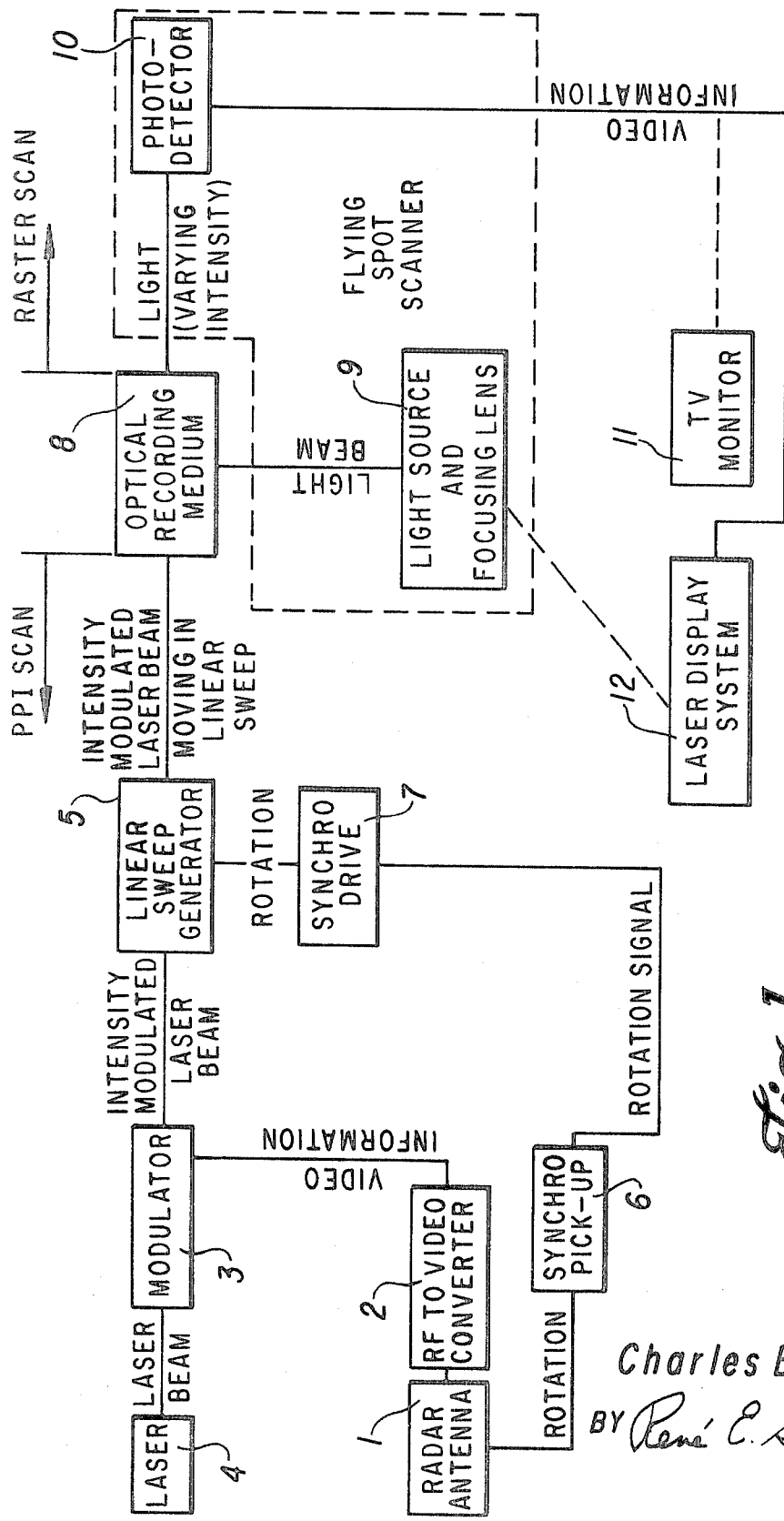
FIG. 1 is a block diagram representing the scan conversion system according to the invention.

Referring now to the figures of the drawings, FIG. 1 illustrates a preferred embodiment of the conversion system of the invention. The RF signal from the radar antenna 1 is converted into a video signal by converter 2, and the video signal is then applied to the light modulator 3. A laser beam from a laser source 4 is passed through the modulator 3 where the beam is intensity modulated in accordance with the video signal. This technique of modulating a laser beam by a video signal is more fully described by C. E. Baker and A. D. Rugari, "The Laser Display, A Large Screen, Real Time, Display Technique," Society For Information Display, Sixth National Symposium On Information Display, pp. 94—96. The intensity modulated laser beam is then formed into a series of linear sweeps by the linear sweep generator 5, which will be more fully described at a subsequent place in this specification. In order to generate a PPI scan pattern, the beam that has been formed into a series of linear sweeps is then rotated about a circle, the center of which is the beginning point of each such sweep and the radius of which is defined by the length of the sweep. The rotation of the beam is in synchronism with the rotation of the antenna, and this synchronism with the rotation of the antenna, and this synchronism is effected by using a synchro system. The synchro pickup unit 6 is driven by the rotation of the antenna 1, and the synchro drive unit 7 operates in response to the rotational signals from the pickup unit 6 to cause (through appropriate gearing) the linear sweep generator 5 to be rotated in synchronism with the rotation of the antenna. The intensity modulated rotating linear sweep thus generated is projected onto an optical-recording medium 8 which, in the preferred embodiment of the invention, comprises a photochromic glass plate or alternatively a photochromic film. The glass plate will be used for illustrative purposes in the remainder of this specification. The intensity modulated beam thus impinging upon the plate 8 causes the transmittance of the plate at a point being scanned to vary in a proportional relationship to the intensity of the beam at such a point. The varying intensity of the scanning beam, representing radar target information, will accordingly cause a varying transmittance of the plate 8, similarly corresponding to target information detected in the full sweep of the radar antenna.

To convert from a PPI scan, which is being generated on the plate 8, to a raster scan, the plate 8 is scanned by the beam from a suitable light source 9, which beam is focused upon the opposite side of the plate 8 and moves thereover in a raster scan pattern. The amount of light in the beam from the light source 9 that passes through the plate 8 will vary according to the transmissivity of the plate at the point scanned. This variance in amount of light passing through the plate is detected by a photodetector 10 which converts the light variations into varying electrical signals. The light source 9 and the photodetector 10 together constitute a flying spot scanner. The electrical output from the photodetector 10 is applied to a display device where a raster scan image of the PPI scan generated image is produced. This display device can take the form of a television monitor 11 or a laser display system 12.

The photochromic glass plate used as the optical-recording medium 8, above, has certain storage properties which are of particular utility in this invention. Briefly described and enumerated, they are: (1) the material reacts to light in a completely reversible manner, somewhat analogous to recording tape reacting to a magnetic field; (2) the time required by the material to return to its original state after removal of the exciting light may be varied by controlling the temperature of the material and/or the ambient light impinging upon the material, thus a storage function can be realized for information recorded on the material; and the material has a very high resolution capability. A further and more complete discussion of these properties will be found in an article by Gail P. Smith, entitled "Chameleon In The Sun: Photochromic Glass," IEEE Spectrum, Dec. 1966.

The photochromic glass plate 8 can be operated in either of two modes for effecting the recording and storage function as described above. Before considering these modes in detail, certain other characteristics of the plate should be noted. In an unexcited state, the glass is generally clear and can be darkened by exposure to ultraviolet light (about 3800 A). The glass will again become clear upon removal of the excitation (the reversibility mentioned above), but the clearing is relatively slow. However, the clearing time can be reduced and better control obtained over the clearing time by applying light in the near infrared region (about 6000 A) and/or increased temperature to the darkened glass, thereby causing bleaching of the glass. Accordingly, one method of recording the PPI information on the plate is to use a modulated ultraviolet light beam to trace the PPI image on the plate. The varying intensity of the beam, representing radar target information will cause darker areas on the plate than the surrounding areas, which darker areas represent radar target information. The storage time of the image is controlled by controlling the temperature of the plate and/or applying a controlled amount of infrared light to the plate. Another, and preferred, method is to predarken the plate with an ultraviolet light and then use a modulated near infrared light for forming the image to bleach the plate where a target is to be represented. Thus a target would appear as a clear area on a dark background, (in practice a neon-helium laser operating at 6328 A is used for the bleaching light beam).

In theory the plate could be predarkened using solely an ultraviolet light source; however, due to practical limitations on getting exactly the right combination of a wavelength and power, in such a light source, temperature control (in the range of 75° F to 150° F) over the plate is utilized and a limited amount of infrared light is added to the ultraviolet light falling on the plate, to control the degree of darkening of the plate and the storage time. This combination effectively achieves the same result as if an optimum ultraviolet light source had been available.

Another characteristic of the photochromic material to be noted is its relative insensitivity to light in the middle of the spectrum, between ultraviolet and the near infrared (i.e., about 5000 A). This characteristic is extremely useful in "reading" the information recorded on the plate. Because of this characteristic, a "reading" beam of such an intermediate wavelength can be used to scan the information recorded on the plate without disturbing that information record.

The glass plate used in connection with this invention is a silver halide photochromic glass such as that made by Corning Glass Co. The alternative photochromic film is such as that made by American Cynamid.

In order to more clearly describe the different elements that make up the above system, two distinct and independent functions of the system will be defined and amplified. Only those elements which are pertinent to one of the functions will be described in connection with that function. The two functions referred to are the "write" function by which a PPI scan is caused to be generated on the photochromic plate 8 by the laser beam, and the "read" function which includes the scanning of the "image" on the photochromic plate by a raster scanning "reader" such as a flying spot scanner and the subsequent display of the image on a TV monitor or laser display system.

In order to "write" a PPI pattern onto the photochromic plate 8, (that is, changing the transmittance of the plate in response to the intensity modulated laser beam, as previously described) two different actions are required. First, the intensity modulated laser beam must be converted into a linear sweep corresponding to the transmission and return of the radar pulse from the radar antenna, and, second, the sweep must be rotated around a circle corresponding to the rotation of the antenna.

Figure 2:
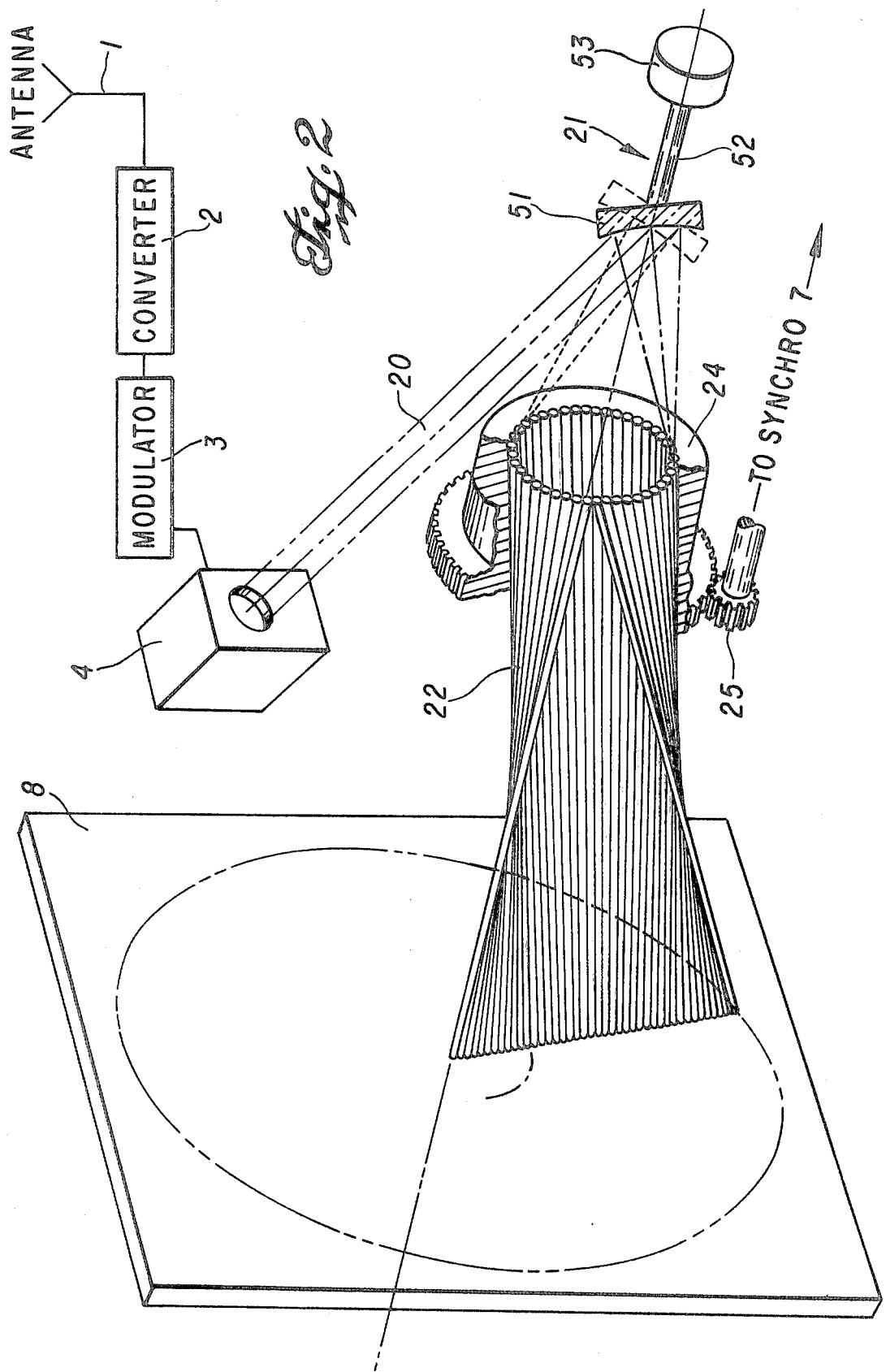
FIG. 2 illustrates schematically one embodiment of a PPI scan generator using a rotating fiber-optic bundle.

One embodiment of the apparatus by which the "write" function is performed is illustrated in FIG. 2, wherein the conversion of the intensity modulated laser beam into a linear sweep is accomplished by the circular resonant scanner 21 operating in conjunction with a fiber-optic array 22, the array being circular at the forward end and linear at the opposite end, said opposite end being adjacent to the surface of the photochromic plate 8.

Before describing the interrelation between the circular scanner 21 and the fiber-optic array 22, the physical characteristics of each will be briefly described.

The circular scanner 21 comprises a concave mirror 51 which is attached to one end of a fiber rod 52, the other end of the rod being secured to a transducer 53. The transducer has two orthogonal driving fields (not shown) and is driven by two alternating signals of the same frequency but 90° out of phase. This driving signal applied to the transducer causes the fiber rod 52 in the absence of any physical constraint to traverse a circular path (Lissajous effect). However, because of the inertia of the mirror, the center of the mirror and the end of the rod 52 attached to its center remain at a fixed point. This causes the mirror to nutate about its center (like the nodding of a spinning top) resulting in the modulated laser beam 20 transmitted from the laser source 4 and reflected from the mirror to move in a circular pattern.

The fiber-optic array 22 comprises an array of fiber-optic bundles, each bundle being preferably a rectangularly shaped rod comprised of a plurality of fiber-optic fibers. A plurality of such bundles are placed and securely bonded longitudinally in a plane adjacent to one another, with one end of the plane array formed into a circle by connecting the two outside fiber bundles together at that end, and the opposite end rigidly maintained in the linear plane array.

Due to the light transmitting properties of the fiber-optic bundles described above, any light striking the end of a bundle at the circular end of the array, will be transmitted virtually unchanged to, and out of, the bundle at the linear end of the array. Thus, a linear sweep can be generated from a circular pattern of light impinging on successive bundles at the circular end of the array.

The scanner 21, the fiber-optic array 22 and the photochromic plate 8 are physically so arranged relative to one another that the circular end of the array faces the mirror 51 and the linear end of the array faces the plate 8 in close proximity therewith, the outside bundle at one end of the linear end of the array constituting the center of a radius completed by the outside bundle at the other end of the array. To minimize light spreading and loss of resolution, the linear end of the optic bundle should be placed as close as possible to the surface of the photochromic plate 8, a distance of the order of .0001 inch being adequate in this respect. Hence, the modulated laser beam 20 reflected by the mirror 51 will be focused on a fiber bundle at the circular end of the fiber-optic array, and the nutation of the mirror will then cause the focused beam to successively strike successive bundles around the circular end of the array. Each such bundle will then transmit the light striking it at the circular end to the photochromic plate 8 at the linear end.

Having described an apparatus for converting the modulated laser beam 20 into a linear sweep, it is now necessary to rotate the sweep about a circle to generate the desired PPI image on the plate 8. This is done by rotating the fiber-optic array 22 in synchronism with the rotation of the antenna. The center of rotation of the array passes through the center of its circular end and through one of the outside bundles at the linear end, the other outside bundle tracing the circumference of the circle as the array rotates. The array is mounted in bearings 24 for rotation and driven through gear 25 by synchro drive 7 in synchronism with the movement of the radar antenna 1 (see FIG. 1) as previously described.

In order that the sweep generated as above-described be meaningful and a true picture of the received radar signal, it is necessary that the beginning of the sweep of the modulated laser beam 20 be always reflected by the mirror 51 "initially" to the fiber bundle which extends to the center of the circle that will be generated on the photochromic plate 8 and "lastly" to the fiber bundle that extends to the terminal end of the radius, which defines the circle on the plate 8, at the linear end of the array. As shown in FIG. 2, these two bundles are adjacent to each other at the circular end, so that one complete traversal by the modulated laser beam 20 around the circular end of the fiber-optic array 22 will represent a complete sweep of the modulated laser beam. The equality of rotation time of the laser beam around the fiber-optic array and the sweep time of the radar signal is accomplished by causing the mirror 51 to be nutated by the transducer 53 at the radar pulse repetition rate. In the absence of compensation, the rotation of the array would cause each sweep to start on a different bundle for each different position of the array about the generated circle. Therefore, in order to make each sweep start always on the fiber bundle located at the center of the circle, the rotational frequency of the mirror 51 is made equal to the pulse repetition frequency minus the rotational frequency of the fiber-optic array 22. This compensation is effected by the appropriate selection of the frequency that drives the transducer 53.

Because the light beam 20 is of varying intensity, the amount of light reflected to each successive bundle (from the mirror 51) and transmitted therethrough will differ for each bundle. Thus, the light transmitted out of the linear end and onto the plate 8 will generate a line of varying transmittance on the plate. This line will indicate portions of targets lying along that line. As the array rotates (in synchronism with the radar antenna) subsequent lines of date are recorded so that after a complete rotation of the array, the total PPI target presentation is recorded on the plate.

Figure 3:
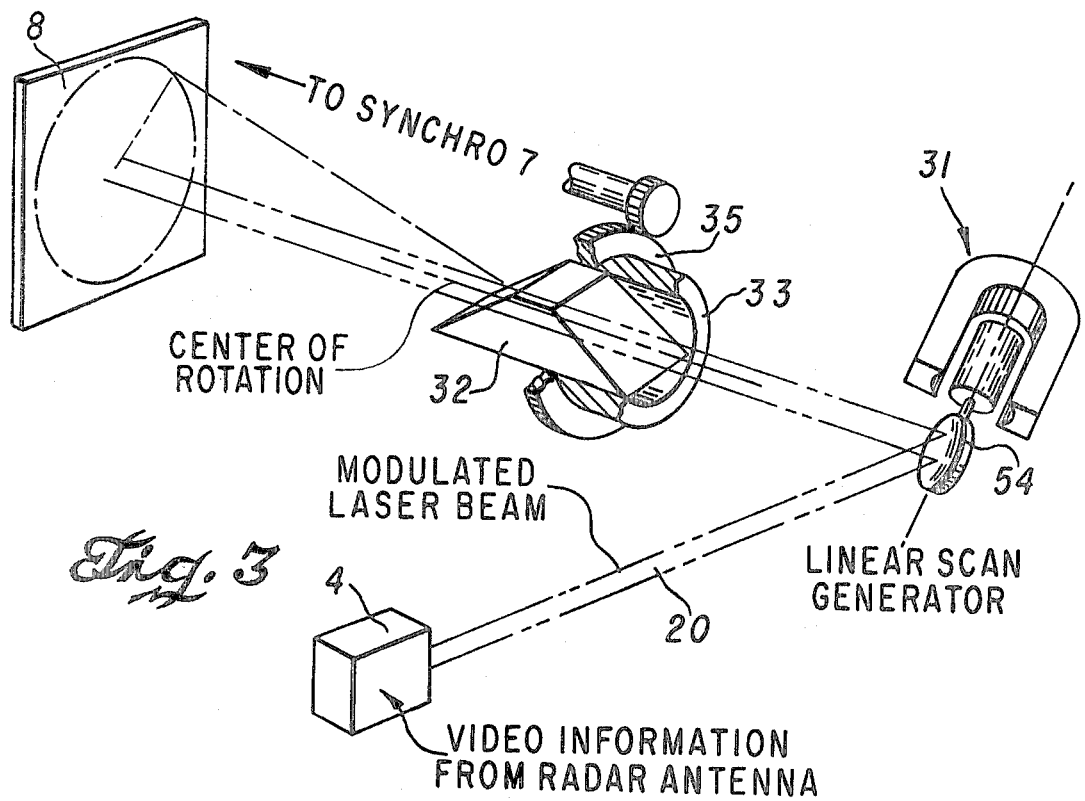
FIG. 3 illustrates schematically another embodiment of a PPI scan generator using a DOVE prism.

FIG. 3 illustrates another embodiment of the "write" function of the invention. In this figure, the laser beam 20, modulated by the radar video information through modulator 3 (shown in FIG. 1) is converted into a linear sweep by the linear sweep generator 31. This linear sweep generator is basically a d'Arsonval galvanometer, the moving mirror 54 of which is made concave in order that the parallel rays of the laser beam 20 can be brought to a focus on the photochromic plate 8. The generator is more fully described by Baker, page 98 of the previously referenced article. The linear sweep is generated by driving the linear sweep generator 31 by a sawtooth waveform whose frequency is the same as the pulse repetition frequency. The mirror 54 is in such a position at the bottom of the sawtooth ramp that the reflected laser beam 20 will come to a focus at the center of the photochromic plate 8. As the mirror then moves in response to the increasing amplitude of the sawtooth ramp, the focused beam moves linearly along (and outward from the center of) the photochromic plate, so that at the peak of the ramp, the sweeping beam reaches its end point corresponding to the time for a new pulse to be transmitted and a new sweep to begin. The "flyback" time for the sawtooth and the mirror is very short, so that a new sweep begins essentially instantaneously following the end of the previous sweep.

Rotation of the sweep to achieve the PPI image on the plate 8 is effected by passing the laser beam 20, which has been formed into a linear sweep by the linear sweep generator 21, through a rotating Dove prism 32. The Dove prism has the property of rotating an image passing through it 360° for each 180° of prism rotation. Hence, to generate the PPI image on the photochromic plate 8 the prism is rotated at one-half of the antenna rotational speed in order to rotate the image at the actual antenna speed. For this purpose, the prism 32 is mounted on bearings 33 and driven by synchro drive 7 through gear 35 in the same manner as previously described for the rotating array 22 of FIG. 2, except that the gearing is changed to reduce the speed by a factor of 2.

In the embodiment of the invention depicted in FIG. 3 it will be noted that, in contrast with the embodiment shown in FIG. 2 wherein the linear end of the array 22 is placed very close to the surface of the plate 8 in order to avoid any spreading of the light beam emitted from the optic fibers, the rotating Dove prism 32 is not and need not be placed close to the surface of the plate 8 since the light beam from the sweep generator mirror 54 is brought to a sharp focus on the surface of the plate 8.

The type of laser preferred for use in the above-described "write" function is one that emits a red light (e.g. a neon-helium laser). The red beam of light bleaches the photochromic plate 8 along the path traced by the beam in accordance with an applied radar signal. In order to use the red beam for tracing the PPI image on the photochromic plate 8, the plate is predarkened by flooding it with a blue or ultraviolet light. The storage persistence of the signal traced on the plate by the beam is controlled by the amount of blue light to which the plate is continuously exposed and by control of the temperature in the area surrounding the plate.

Figure 4:
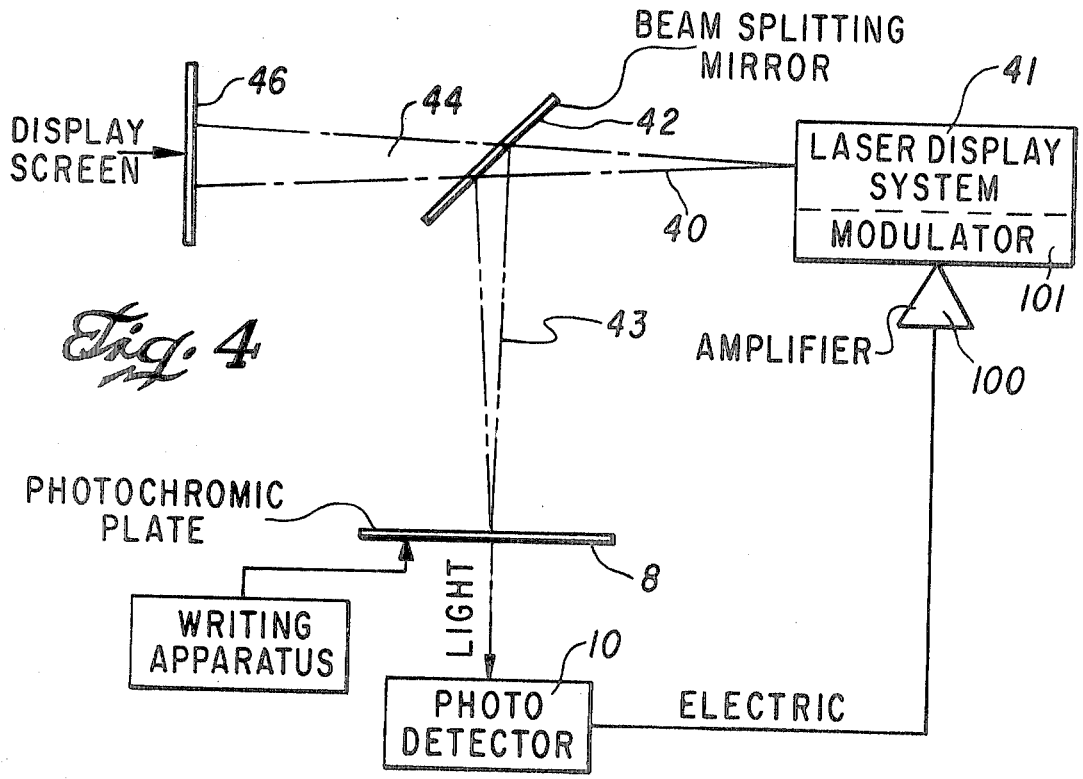

The "read" function of the invention is accomplished by a flying spot scanner, and in the preferred embodiment of the invention, such scanner is combined with a laser display system, such as that described by Baker, p. 86 et seq. in the previously referenced article, such that the same light source is used for both scanning and display. This embodiment is illustrated in FIG. 4. In this figure, the light output 40 from the laser display system 41, moving in a raster scan, is passed through a beam splitting mirror 42 such that a small portion 43 of the beam is deflected to the exposed photochromic plate 8. The amount of light which passes through the photochromic plate for a given intensity of the scan beam 43 will vary according to the degree of "exposure" of the plate, corresponding to the image which has been traced thereon by the apparatus of FIG. 2 or FIG. 3. A photodetector 10 is located beneath the photochromic plate such that light passing through the plate from beam 43 will be sensed by the photodector. As the intensity of the light sensed by the photodetector changes, corresponding changes in its electrical output are applied to a modulator 101 of the laser display system 41 through an amplifier 100 (a part of the modulator) whose output is connected to the modulator and whose input is connected to the output of the photodetector. The modulator, responding to the photodetector voltage as amplified by the above-mentioned amplifier 100, causes the intensity of the light output 40 of the laser display system 41 to be increased or decreased by an amount sufficient to so offset the change in intensity of the beam 43 passing through the photochromic plate that the light intensity striking the photodetector 10 remains essentially constant. It should be noted, however, that while the intensity of the light striking the photodetector 10 is kept at a constant value, due to the action of the modulator 10 responding to the variable voltage emitted by the photodetector, the intensity of the portion 43 of the laser beam 40 striking the plate 8 and the intensity of the portion 44 of the beam 40 that passes through the mirror 42 and strikes the display screen 46 will vary in correspondence to the variable voltage emitted by the photodetector 10. The result is that beam 44 will trace on the screen the image received on the plate 8.

From the preceding discussion, it may be seen that the intensity of the display beam 44 is the inverse of the transmittance of the plate 8, so that photographically speaking, as it were, the image projected on the screen 46 will be the negative of the image stored on the plate 8.

The "read" system just described uses negative feedback, that is, a negative going voltage at the output of the photodetector, will produce a positive going voltage at the input to the modulator, and vice versa. This can be accomplished by realizing an inversion in the amplifier 100 connected to the modulator input (as for example by using an amplifier with an odd number of stages).

A photographic positive on the display screen 46 of the image on the plate 8 can be produced by using positive feedback in the "read" system above discussed. In this embodiment, the beam 43, when sweeping across the plate 8 will, upon encountering an area of higher transmittance than the surrounding area, cause an increase in the electrical output of the photodetector, which, because of the feedback loop will in turn cause an increase in the light permitted to pass through the modulator. Thus, a brighter area would appear on the display screen 46 corresponding to an area on the plate 8 of higher transmittance. Because of the use of positive feedback, it is necessary that the loop gain (of the feedback loop) be kept below 1 (or unity) to keep the system from going into oscillation. This is accomplished by adjusting the gain of the amplifier 100 connected to the input of the modulator.

It should be noted that the beam splitting mirror 42 need not have a particularly high reflectivity (ordinary plate glass with a reflectivity of about 4 percent was used in the described embodiment) since only a small portion of the light in the beam 40 is necessary to activate the photodetector 10. Because of the relatively low intensity, and the use of a relatively nonsensitive wavelength of the beam 43 scanning the photochromic plate 8, no discernible changes in the image on the photochromic plate will result from its being scanned by the read beam 43.

Figure 5:
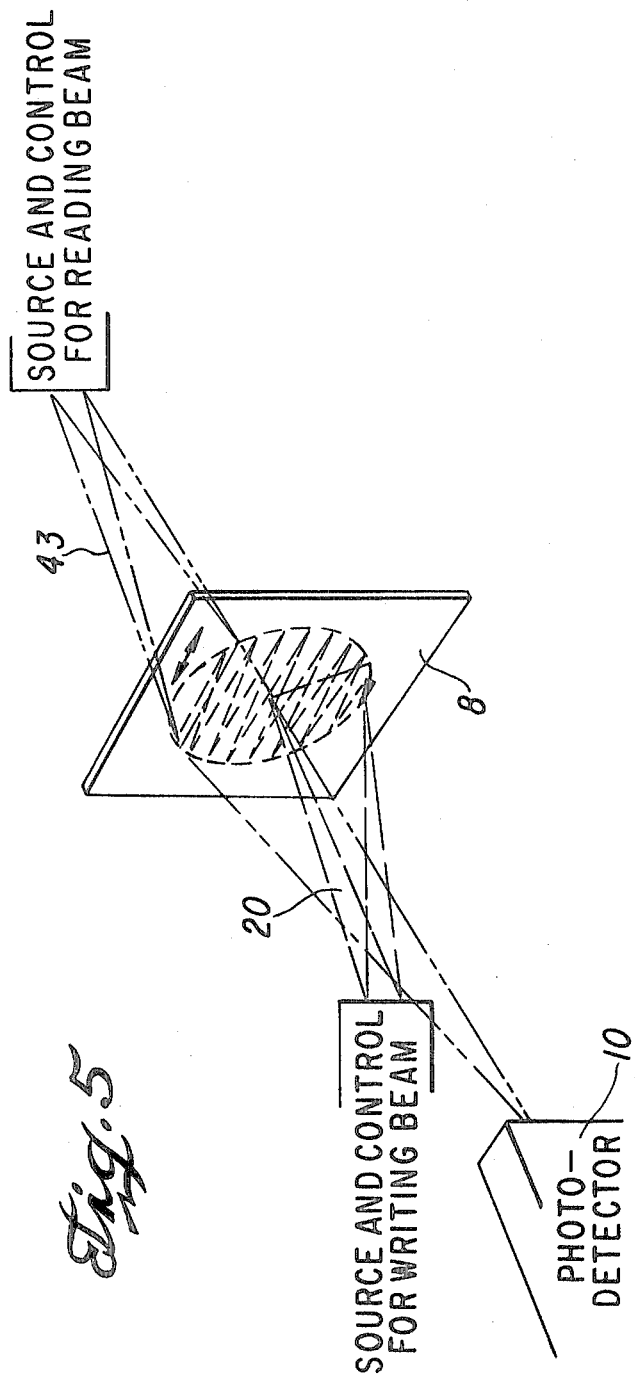
FIG. 5 shows in broad perspective the PPI scan generator and the reading system relative to the transfer medium.

FIG. 5 shows schematically the interworking of the write function and the read function relative to the photochromic plate 8. The functions are as previously described in connection with FIGS. 2, 3, and 4, this figure being intended to convey, in overall perspective, the physical arrangement of the major elements of the invention relative to one another, the numerical designations in the FIG. referring to apparatus disclosed in FIGS. 2, 3, and 4.

Briefly described, the writing beam 20 sweeps outward from the center of the plate 8 and moves in a circle about said center as previously described. At the same time the reading beam sweeps in a raster pattern along the opposite side of the plate 8. Finally the photodetector 10, located on the side of the plate opposite from the equipment generating the reading beam, operates to receive information contained in the varying light intensity passing through the plate 8 resulting from the intersection of the reading beam with the areas of varying transmittance on the plate 8 produced by the writing beam 20 and converts the light variations into electrical variations. As previously discussed, the reading beam does not interfere with the information recorded on the plate because of the low power and intermediate frequency of that beam. In order to avoid any possibility of crosstalk between the reading beam and the writing beam, thus imparting erroneous information to the photodetector, a filter which will pass only the frequency of the reading beam is inserted at the input to the photodetector.

Although the described embodiment uses two lasers, one for the write function and the other for the read function, it is possible to use a single laser, such as argon, having two colors, and by appropriate use of lenses and mirrors to separate the two colors and use the "insensitive" color for the read function and the "sensitive" color for the write function.

It is to be understood that the method of scan conversion herewith shown and described is to be taken as a preferred example of the same and that various other types of scan conversions can be accomplished without departing from the spirit and scope of the invention as defined by the appended claims.

I claim:

1. An optical scan conversion system for converting a radar PPI scan into a raster scan comprising:
   a. a photochromic glass plate;
   b. a laser so arranged that a light beam therefrom impinges upon one surface of said plate;
   c. a modulator responsive to a radar video signal applied thereto, for modulating the intensity of said light beam;
   d. a linear sweep generator for converting said modulated light beam into a linear sweep across said one surface of said plate whereby said modulated laser beam causes the information represented by the modulation of the beam to be imparted on said plate in the form of variable transmittance thereof proportional to the variable intensity of the beam;
   e. synchro means for rotating said linear sweep about a circle in synchronism with a rotating radar antenna, whereby said linear sweep across said plate is also rotated in synchronism with said antenna, said sweep and said rotation of said information carrying beam causes a representation of a PPI scan pattern to be recorded in said plate;
   f. an optical information detector to scan said plate in a raster scan pattern for detecting the PPI information stored on said plate by said modulated laser beam and converting same to an electrical signal; and
   g. a display device operative in response to said electrical signal for displaying said PPI information in a raster scan format.

2. An optical scan conversion system for converting received electrical signals from a first scan pattern to a second scan pattern, comprising:
   a. a photooptical recording medium;
   b. a first light source and a second light source;
   c. means operative in response to electrical signals representative of information for modulating the intensity of a light beam from said first light source;
   d. a rotatable linear sweep generator for transmitting said modulated first light beam linearly to a surface of said photooptical-recording medium in accordance with said first scan pattern, thereby to record on said surface the signals represented by the modulations of said first light beam, said recording being effected by the modulations varying the transmittance of said recording medium, said linear sweep generator including a moving mirror and rotating Dove prism intersecting said modulated first light beam which bring said light beam to a focus on said recording medium, the movement of said focused beam being oscillatory and in a single plane, whereby a straight line is generated upon said recording medium by said moving light beam,
   e. detection means operative in response to a second light beam from said second light source and transmitted through said recording medium according to said second scan pattern for producing electric signals representative of the information recorded on said recording medium by said modulated first light beam; and
   f. display means operative in response to said electric signals produced by said detection means for producing a visual representation of said electric signals.

3. An optical scan conversion system for converting received electrical signals from a first scan pattern to a second scan pattern, comprising:
   a. a photooptical-recording medium,
   b. a first light source and a second light source;
   c. means operative in response to electrical signals representative of information for modulating the intensity of a light beam from said first light source;
   d. a rotatable linear sweep generator for transmitting said modulated first light beam linearly to a surface of said photooptical-recording medium in accordance with said first scan pattern, thereby to record on said surface the signals represented by the modulations of said first light beam, said recording being effected by the modulations varying the transmittance of said recording medium, said linear sweep generator comprising:
      1. a nutating mirror which intersects said modulated first light beam at all times, and
      2. a planar array of fiber-optic bundles having one end formed into a closed end and the opposite end into a linear array, said fiber-optic bundles being so arranged that said beam of modulated light reflected from said nutating mirror successively impinges upon the ends of successive bundles around said closed end, the linear end being placed in close proximity to a surface of said recording medium, whereby said nutating mirror causes said modulated light beam to be successively transmitted through each fiber-optic bundle of said array at the closed end thereof, whereby due to the light transmitting properties of said fiber-optic bundles said modulated light beam is transmitted unchanged to said linear end of the above, whereby any light passing through said array and out at said linear end thereof will impinge on said surface, and whereby a linear sweep is effected across said surface of said recording medium,
   e. detection means operative in response to a second light beam from said second light source and transmitted through said recording medium according to said second scan pattern for producing electric signals representative of the information recorded on said recording medium by said modulated first light beam, and f. display means operative in response to said electric signals produced by said detection means for producing a visual representation of said electric signals.

4. An optical scan conversion system according to claim 3 wherein the means for rotating said linear sweep generator rotates said fiber-optic array to maintain one end of said linear end fixed at some point on said surface of said recording medium.